United States Patent
Maher et al.

[11] Patent Number: 6,161,576
[45] Date of Patent: Dec. 19, 2000

[54] INTEGRATED TURBO PUMP AND CONTROL VALVE SYSTEM

[75] Inventors: Joseph Maher, Wenham, Mass.; Richard W. Olmsted, Londonderry, N.H.

[73] Assignee: MKS Instruments, Inc., Andover, Mass.

[21] Appl. No.: 09/339,082

[22] Filed: Jun. 23, 1999

[51] Int. Cl.$^7$ ...................................................... E03B 5/00
[52] U.S. Cl. .............................. 137/565.23; 137/599.11; 137/601.15
[58] Field of Search .......................... 137/562.23, 599.11, 137/601.14, 601.15

[56] References Cited

U.S. PATENT DOCUMENTS

| | | | |
|---|---|---|---|
| 2,665,704 | 1/1954 | Kanuch ........................... | 137/599.11 X |
| 2,875,785 | 3/1959 | Foltzer et al. ................. | 137/601.15 X |
| 3,144,035 | 8/1964 | Hablanian et al. ............. | 137/565.23 X |
| 3,537,474 | 11/1970 | Rohrer ............................... | 137/565.23 |
| 3,986,521 | 10/1976 | Wittmann-Liebold et al. ... | 137/565.23 X |
| 4,361,418 | 11/1982 | Tscheppe ................................... | 417/54 |
| 5,469,885 | 11/1995 | Nishimura ........................... | 137/565.23 |
| 5,552,017 | 9/1996 | Jang et al. ........................... | 156/643.1 |
| 5,863,842 | 1/1999 | Ohmi ..................................... | 438/758 |
| 5,931,192 | 8/1999 | Smith et al. ........................ | 137/599.11 |

*Primary Examiner*—John Rivell
*Attorney, Agent, or Firm*—McDermott, Will & Emery

[57] ABSTRACT

A gas delivery system comprises a gate valve that can be connected between a turbo pump and a process chamber. The gate valve includes a valve body, a valve seat and a housing constructed to support the valve seat, wherein (a) the valve body is secured within the housing so as to move relative to the valve seat between an opened position and a closed position, and (b) the housing is provided with a gas passageway connected to each of the spaces on opposite sides of the valve body when the valve body is in the closed position. A plurality of valves are mounted to the housing of the gate valve and arranged so as to control the flow of gas through the passageway so that in operation the chamber and turbo pump each can be pumped down through the gas passageway with a second pump connected to one of the valves, and gas can be transferred and the flow controlled through the passageway bypassing the valve body when the valve body is in the closed position.

9 Claims, 5 Drawing Sheets

INTEGRATED TURBO PUMP AND CONTROL VALVE SYSTEM

RELATED APPLICATIONS

This application is related to U.S. patent application, Ser. No. 09/339,084, entitled Pendulum Valve Assembly, filed in the name of Richard W. Olmsted on the same day as the present application, and assigned to the present assignee.

FIELD OF THE INVENTION

The present invention relates to gas delivery systems for ultra-high purity gases, such as systems used to provide process gases for semiconductor manufacturing, and more particularly, to an integrated turbo pump and control valve system. As used herein, the term "gas" includes gases and vapors.

BACKGROUND OF THE INVENTION

High purity gas delivery systems, such as those used in semiconductor manufacturing or other thin film coating processes, typically include a source of high purity gas coupled to a process chamber through a series of gas distribution and control components, such as a mass flow controller, one or more pressure sensors and/or regulators, a heater, one or more filters or purifiers, and shutoff valves. A pump is used to pump each gas from its source to the process chamber.

Some processes must be performed at very low pressures (high vacuums), e.g., a pressure on the order of one torr or less. One ultra-high vacuum system adapted to operate at low conductances includes a turbo pump, and a pendulum or gate valve for controlling the pressure created by the turbo pump within a predetermined range so as to allow very precise control of the mass of the gas flowing to the process chamber. Such systems typically utilize a turbo pump and a combination of valves connected together with gas tubing and suitable connectors so as to provide a closed system as well as careful control of pressure when the pendulum valve is near the closed and sealed position, where pressure control is more difficult.

As the dimensions of semiconductor devices decrease and their densities increase, semiconductor manufacturing processes have become increasingly intolerant of particulate contamination. One important source of such contamination is the gases used during the process, and particularly particulates carried by the wetted surfaces in the passageways through which the gases are delivered from the source to the chamber. Moisture or dust which accumulates within these passageways are carried with the source gas and deposit onto the semiconductor devices being processed, creating defects. Moisture also may corrode the wetted surfaces, leading to flaking of particles from these surfaces. The passageways of the turbo pump, the combination of valves and the connecting tubing and connectors can thus be a source of contaminants.

To reduce contamination of this sort, gas processing components used in manufacturing semiconductor devices are usually made in low-dust, low-moisture environments, and purged for lengthy periods of time at elevated pressures after manufacture. The components are then typically packaged and sealed in pressurized nitrogen for shipment. As a result, the interior of the component is exposed only to the clean room environment in which the semiconductor processing equipment is located, and only for the brief period of time between removal of the packaging and sealing of the component into the processing equipment. In addition, the total path length, or "footprint" of the flow of the gas should be as short as possible to minimize the wetted surface area to which the gas is exposed.

SUMMARY OF THE INVENTION

In accordance with the present invention, an improved gas delivery system designed and constructed so as to reduce the overall size and cost of the system, reduce the footprint provided by the turbo pump and control valve system and yet increase the reliability of the system and allow inexpensive and easy repairs to and replacement of component parts.

The gas delivery system comprises a gate valve that can be connected between a turbo pump and a process chamber. The gate valve includes a valve body, a valve seat and a housing constructed to support the valve seat, wherein (a) the valve body is secured within the housing so as to move relative to the valve seat between an opened position and a closed position, and (b) the housing is provided with a gas passageway connected to each of the spaces on opposite sides of the valve body when the valve body is in the closed position. The gas delivery system also comprises a plurality of valves mounted to the housing of the gate valve and arranged so as to control the flow of gas through the passageway so that in operation the chamber and/or the turbo pump can be pumped down through the gas passageway with a second pump connected to one of the valves, and gas can be transferred and the flow controlled through the passageway bypassing the valve body when the valve body is in the closed position.

In one embodiment, the valves are mounted adjacent one another so as to substantially minimize the footprint of the portion of the passageway between the plurality of valves.

In a preferred embodiment, three valves are mounted on the housing of the gate valve, wherein a first of the valves is connected to the second pump so as to control the flow of gas between the passageway and the second pump, a second of the valves controls the flow of gas between the passageway and the space on the side of the gate valve connected to the chamber, and a third of the valves controls the flow of gas to the space on the side of the gate valve connected to the turbo pump.

In one embodiment, the first and second of the valves are opened and the valve body is positioned in the closed position when using the second pump to pump down the chamber with the second pump. In another embodiment, the first and third of the valves are opened and the valve body is positioned in the closed position when using the second pump to pump down the turbo pump. In another embodiment the second and third of the valves are opened and the first of the values is closed when the valve body is positioned in the closed position so that the gas flows through the passageway bypassing the closed valve body with the control of gas through the passageway being controlled by either of the second and/or the third valve(s).

In one embodiment the first of the valves is a shut off valve constructed to either be opened or closed, and at least one of the second and third of the valves is a control valve constructed to control the flow of gas through the passageway when the valve body is in the closed position.

In one embodiment (a) the housing includes (i) an interior space within which the valve body is moved and (ii) a pair of openings in the housing through which gas passes into the interior space of the housing and out the other side of the gate valve when the valve body is not in the closed position, (b) the valve seat is provided inside the interior space around the edge of one of the openings, and (c) the gas passageway is connected between the interior space at one end, and the edge wall of the one opening between the valve seat and the outside of the housing.

In one embodiment the valve seat for each of the plurality of valves is formed in the housing.

DETAILED DESCRIPTION OF THE DRAWINGS

As mentioned above, many semiconductor processes are carried out in an ultra high vacuum chamber. Using a single roughing pump to reduce the pressure is typically effective at reducing the pressure in the chamber, but based on current trends is usually incapable of pumping a chamber down to the desired vacuum pressures. While turbo pumps do provide the ability to create low enough pressures within a chamber, they must be "primed" in the sense that a vacuum must be created in the pump, for the turbo pump to operate effectively. Thus, a roughing pump and turbo pump are usually used together with at least two valves, one for maintaining the pressure within the chamber once the roughing pump is used to reduce the pressure within the chamber, and the other as a control valve for controlling the rate of pressure reduction provided by the turbo pump. Further, turbo pumps can not operate unless the pressure within the chamber has been initially reduced below the outside ambient pressure. This condition is typically accomplished by using the roughing pump and valves to pump the chamber with the roughing pump down to a desired vacuum pressure before operating the turbo pump to further reduce the pressure in the chamber.

Figure 1:
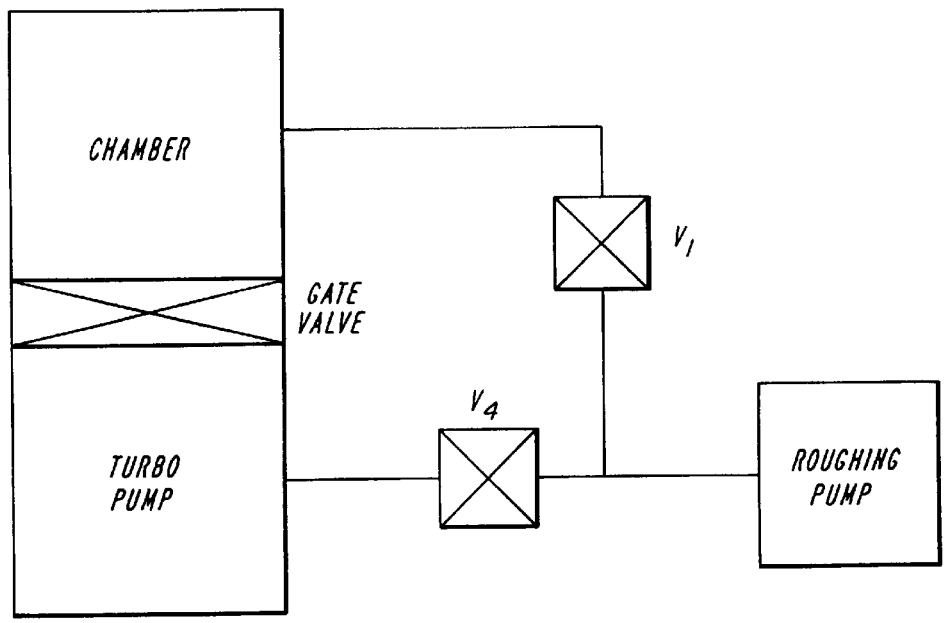
FIG. 1 is a block diagram view of a gas delivery system including a gate valve and one control valve arrangement of the prior art.
Figure 3:
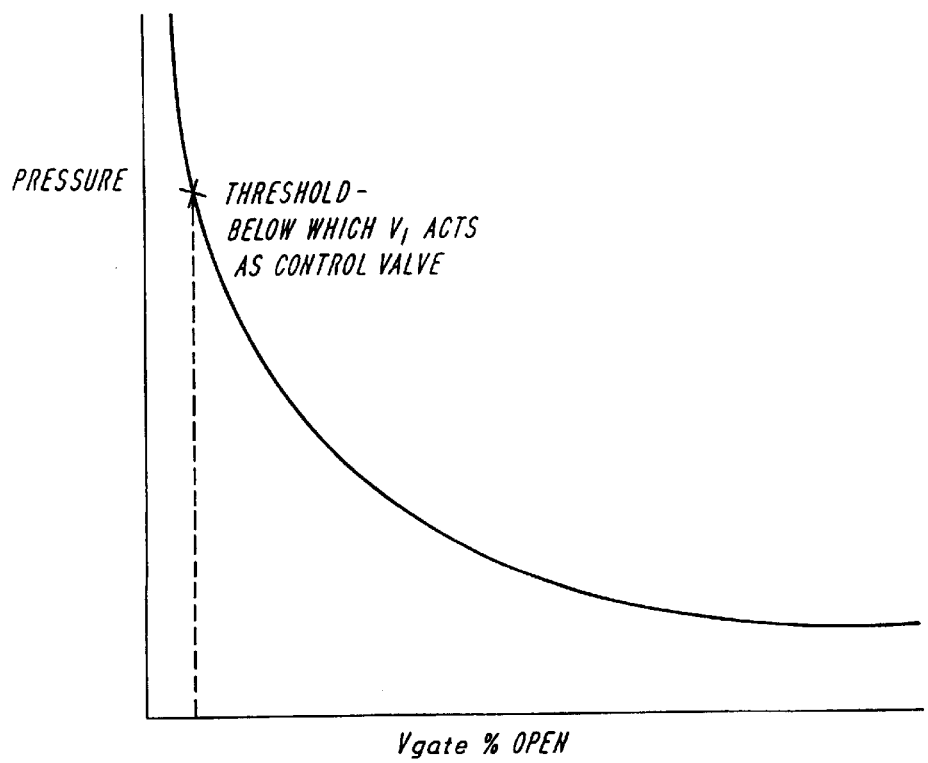
FIG. 3 is a graphical representation of the pressure as a function of the opening of the gate valve.
Figure 2:
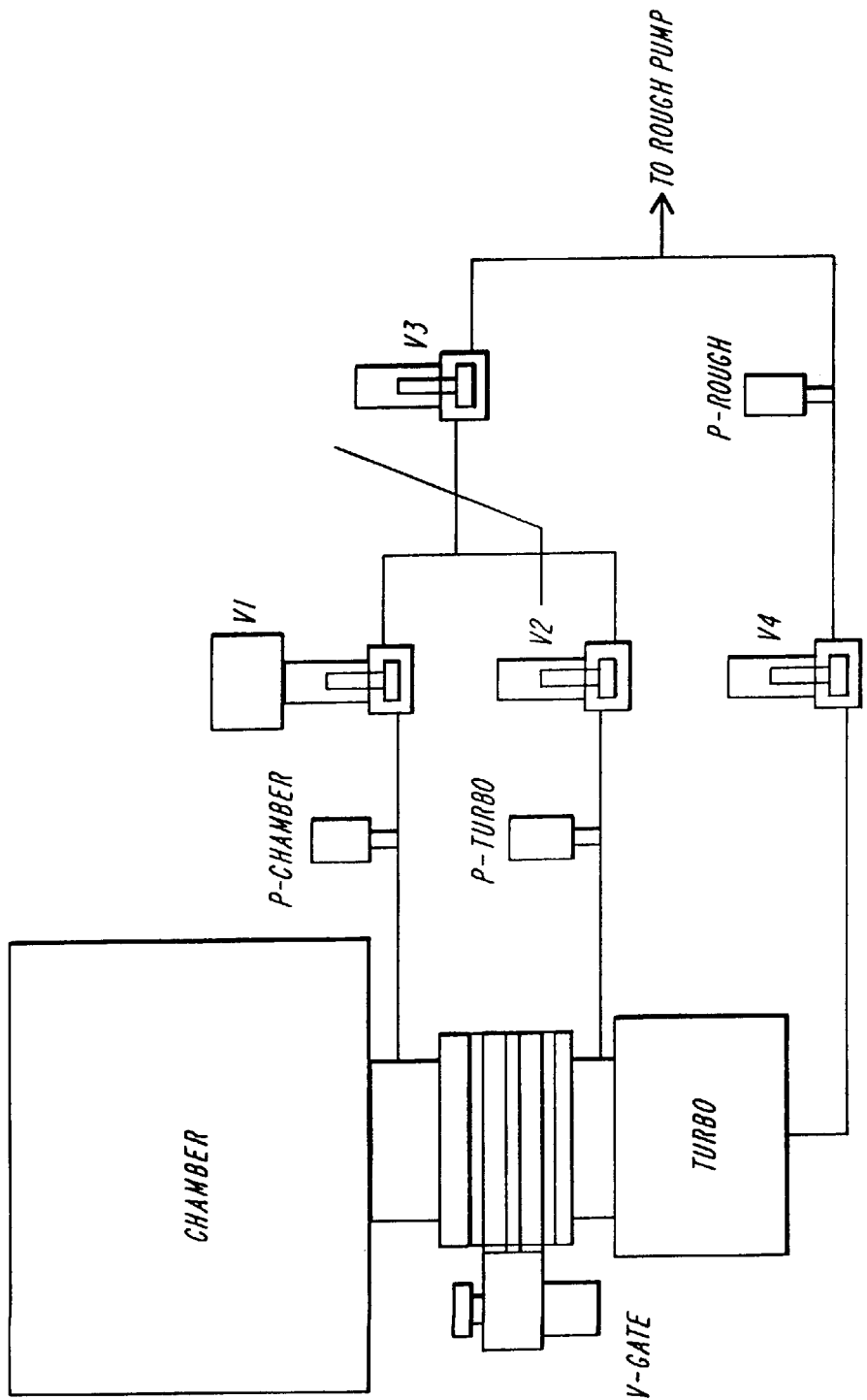
FIG. 2 is a block diagram view of a second gas delivery system including a gate valve and a second control valve arrangement of the prior art.

These concepts are more clearly understood with reference to FIGS. 1–3. As seen in FIG. 1, a turbo pump is connected to a chamber through a gate valve. Two additional valves V1 and V4 are utilized to enable the roughing pump to pump out the turbo pump and the chamber. Valve V1 is connected between the roughing pump and the chamber, while valve V4 is connected between the roughing pump and the turbo pump. With the gate valve closed, and valve V1 initially closed, the valve V4 is opened and the roughing pump is used to evacuate the turbo pump. Valve V4 is then closed and V1 opened so that the roughing pump can then pump down the chamber. The gate valve is then opened and the turbo pump and chamber are both under the roughing vacuum pressure. The system is now ready for the turbo pump to pump the vacuum pressure within the chamber to an even lower vacuum pressure. Thus, the roughing pump is used to pump the chamber down to a predetermined pressure so that the turbo pump can pump it down further to the desired vacuum pressure.

Another problem in pumping a vacuum chamber down to a desired vacuum pressure is that if the chamber is pumped so that the pressure is reduced too quickly, it may create turbulence within the chamber, stirring up particles. Accordingly, it has been proposed to use two additional valves V2 and V3 as shown in FIG. 2.

As one closes the gate valve the pressure in the chamber rises so that the gate valve can be used to control the vacuum pressure within the chamber. If the gate valve is not sufficiently closed to achieve the desired pressure, it may be difficult to reach the desired vacuum pressure. Rather then try to use valves V1 and V2 as bypass valves, V2 is used as an on-off shutoff valve and V1 as a control valve. As shown in FIG. 3, the pressure regulated by the gate valve (as a function of the percentage the gave valve is open) is asymptotic with the y-axis of the curve. Thus, at some point where the gate valve is close to closing, it is too difficult to control the pressure in the chamber. Accordingly, the gate valve can be completely closed, and valve V1 or V2 can be used to more carefully control the pressure within the chamber using the turbo pump.

Thus, in this case valve V1 is used as a control valve, so that by opening the valve V1 slowly one can accomplish a slow pump down of the chamber. Valves V1 and V2 act as bypass valves to opposite sides of the gate valve. Thus, when the gate valve is open, and the chamber is pumped down slowly, the valve V2 is closed and valve V3 is opened. Similarly, when the turbo pump is being pumped down, valve V3 is closed and valve V2 is open. When the gate valve is closed and the valve V1 is used as a control valve, the valves V1 and V2 are open and valves V3 and V4 are closed. As one can see the turbo pump still pumps down the chamber, not through the gate valve, but through the control valve V1 to achieve accurate operation within the narrow range of pressures where operation of the gate valve is too difficult to control.

In general, these components are now made as separate parts requiring separate fittings and interconnecting hoses, increasing the chances of leaks, and providing significant surface areas which can generate unwanted particles that find their way into the chamber where they can contaminate the materials being developed.

Accordingly, in accordance with the present invention, the valves V1, V2 and V3 and the gate valve are all assembled as a single integrated assembly so as to minimize the footprint, i.e., substantially reduce the passageways between the various components, and further reduce the surfaces areas which can generate contaminants.

Figure 4:
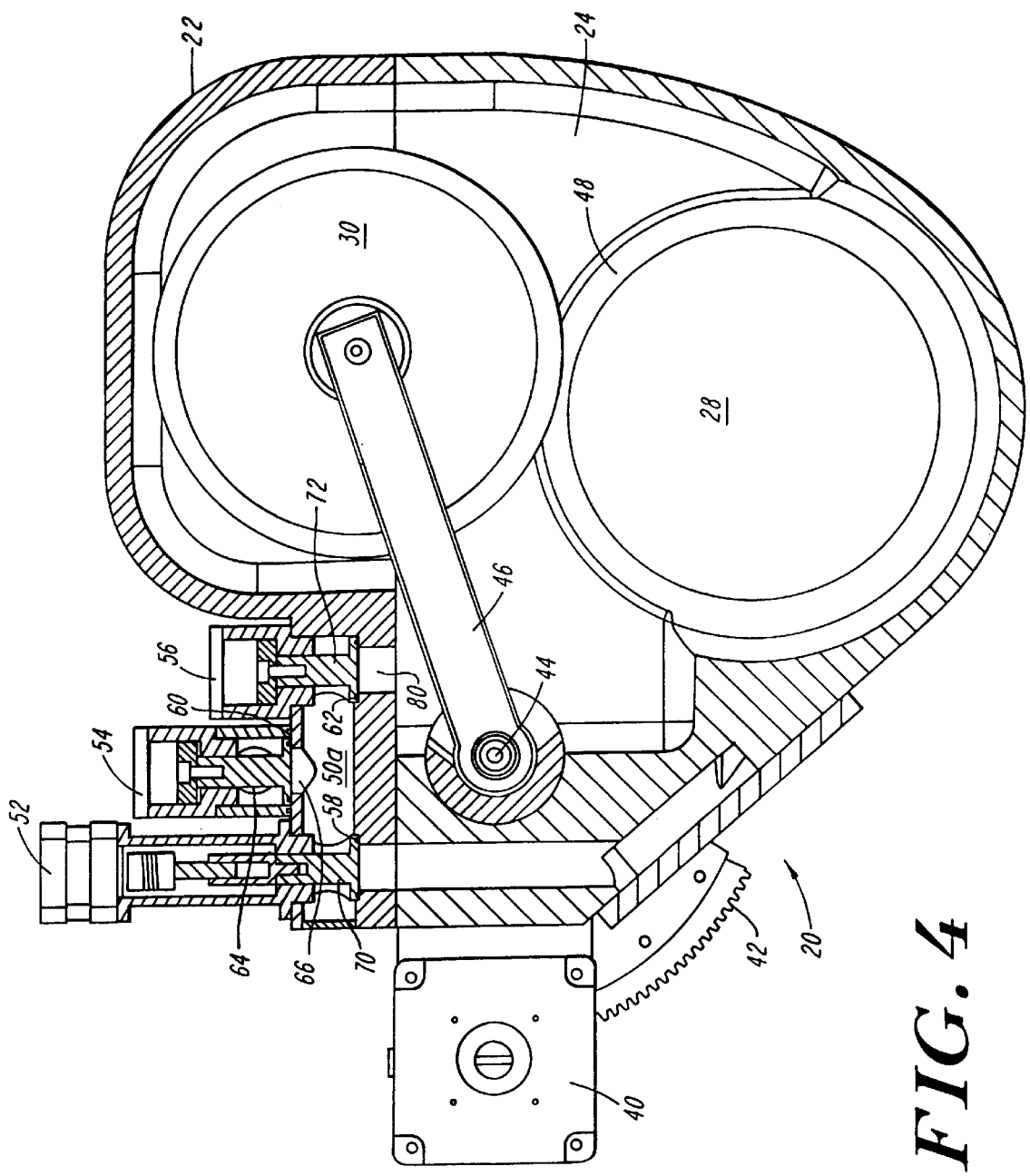
FIG. 4 is a cross sectional view of the gate and control valve assembly of a gas delivery system constructed according to the principles of the present invention and shown with the gate valve opened.
Figure 5:
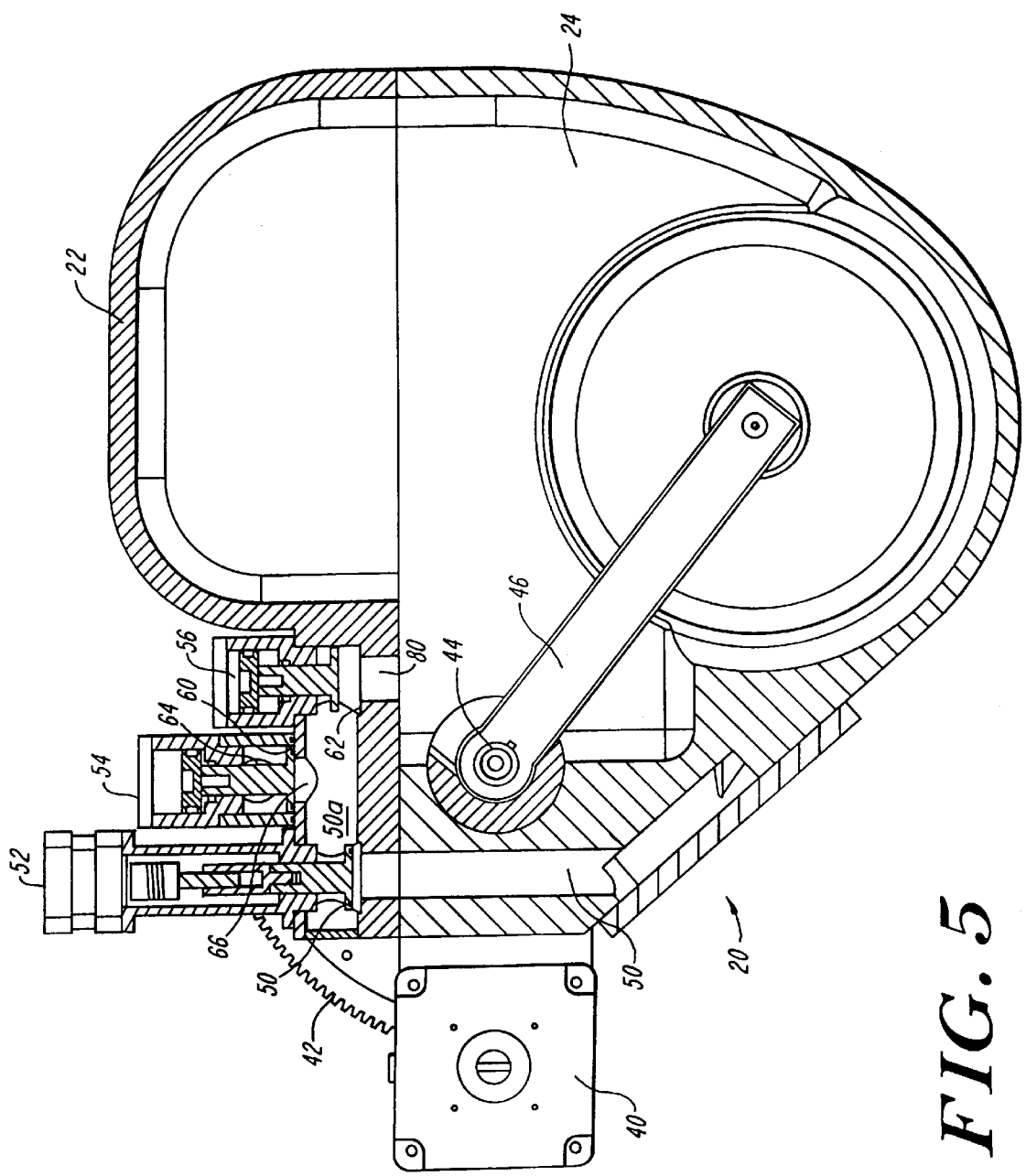
FIG. 5 is a cross sectional view of the gate and control valve assembly of a gas delivery system constructed according to the principles of the present invention and shown with the gate valve closed.
Figure 7:
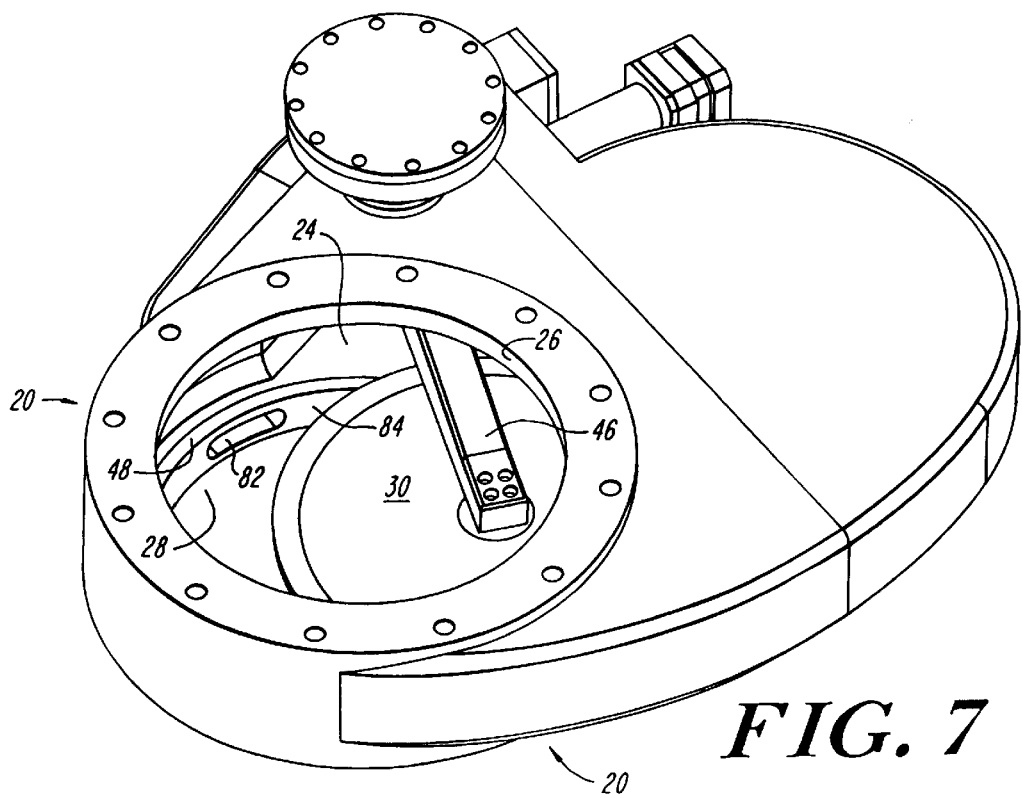
FIG. 7 is a perspective view of the other end of the gate and control valve assembly of the gas delivery system shown in FIGS. 4 and 5, with the gate valve partially opened.
Figure 6:
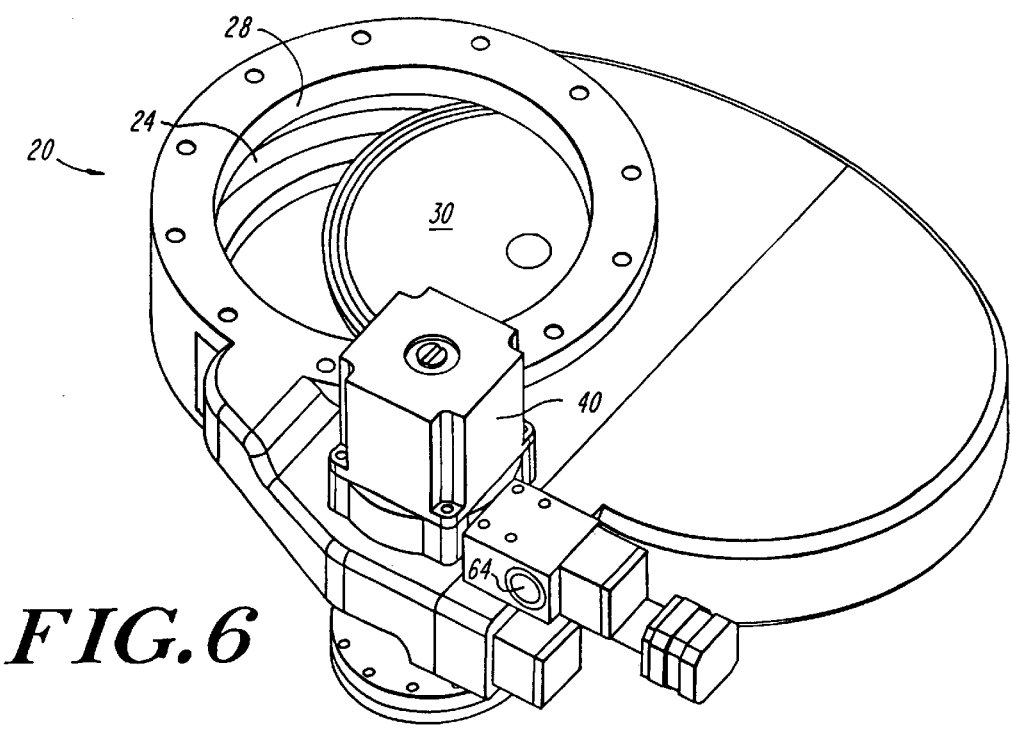
FIG. 6 is a perspective view of one end of the gate and control valve assembly of the gas delivery system shown in FIGS. 4 and 5, with the gate valve partially opened.

More particularly, referring to FIGS. 4–7, the gate and valve control assembly 20 includes a housing 22 defining an interior space 24. The housing 22 includes a pair of opposing openings 26 and 28 through which gas passes into the interior space 24 and out the other side of the gate valve when the gate valve is opened. Thus, one opening is connected to the chamber and the other is connected to the turbo pump. The gate valve controls the flow of gas through the gate valve by controlling the position of the valve body 30 between a completely opened position (as illustrated in FIG. 4) and a completely closed position (as illustrated in FIG. 5).

The gate valve assembly includes a gate valve body 30 preferably in the form of a disk. In order to control the position of gate valve body 30, the assembly 20 includes a motor 40 mounted to housing 22. The motor is coupled through rotary gear 42. The latter is fixed to a shaft 44, which in turn is at least partially mounted in the housing 22 so as to rotate about and move axially along its longitudinal axis (into and out of the plane of FIGS. 4 and 5) in response to rotation of the gear. In particular, a rotary cam element (not shown) is secured to and moves with the longitudinal shaft. The rotary cam element includes a slot defining a cam surface. A cam roller (also not shown) is fixed relative to the housing and is disposed within the slot defining the cam surface. The shaft is also fixed to the pivot arm 46, which in turn supports the valve body 30. As the body rotates from the opened position to a position where the valve body 30 is aligned with the opening 26, the valve body 30 moves within the plane of the disk because the slot of the cam element follows the cam roller in a purely rotational movement. However, when the valve body 30 and opening 26 are substantially aligned, and the shaft continues to rotate about its longitudinal axis, the slot provided with a cam surface follows the cam roller so that the shaft 44, pivot arm 46 and valve body 30 move longitudinally with respect to the opening 26 into contact with a valve seat 48 provided inside of the interior space around the edge of opening 26. This rotating cam mechanism is described in greater detail in copending application, U.S. Ser. No. 09/339,084, filed in the name of Richard W. Olmsted on the same day as the present application, and assigned to the present assignee, the contents of the application being incorporated herein by reference.

In accordance with one aspect of the present invention, the housing 22 is provided with a gas passageway 50 connected to each of the spaces on opposite sides of the valve body 30 when the valve body is in the closed position. In accordance with another aspect of the invention, any number of valves, from one to as many as the design requires, are mounted directly on the housing. In one embodiment valves 52, 54 and 56 (equivalent to valves V1, V2 and V3 of FIG. 3) are mounted directly onto the housing 22 and arranged so as to control the flow of gas through the passageway 50 so that in operation the chamber can be pumped down through the gas passageway 50 with a second pump connected to one of the valves, and gas can be transferred through the passageway bypassing the valve body when the valve body is in the closed position. The valves 52, 54 and 56 are preferably mounted close to another so as to minimize the footprint of the portion of the gas passageway 50 between these valves. Further, the valve seats 58, 60 and 62 can actually be formed in the housing.

The valve 54 (equivalent to valve V3 of FIG. 3) is preferably a shutoff valve provided with an inlet 64 adapted to be connected to a roughing pump, and an outlet 66 connected to the passageway 50 preferably between the two valves 52 and 56. Thus, when valve 54 is opened, the roughing pump can pump gas through the passageway 50, and when closed the passageway 50 is shut off to the roughing pump.

The valves 52 and 56 are sequentially used to control the flow of gas from each side of the gate valve when the valve 54 is opened and the roughing pump is used to pump down the chamber and turbo pump, respectively. At least one of the valves is a control valve used to control the flow of gas through the passageway 50 when the valve 54, and the gate valve is closed, and the assembly is used in the by-pass mode.

As best seen in FIGS. 4 and 5, the passageway 50 includes the section 50a in which valve seats 58 and 62 are provided within the passageway 50 so that when either of the valve bodies 70 and 72 of the valves 52 and 56 move within the passageway section 50a into contact with the respective valve seat, the seal between the valve body and the valve seat closes the passageway 50. On other hand an opening through the housing into the passageway 50a forms the outlet 66 of the valve 54.

It can be seen from the drawings that the passageway 50 in the housing extends at one end as an opening 80 (see FIGS. 4 and 5) in fluid communication with the interior space 24 on one side of the disk-shaped body 30, and at the other end as an opening 82 in the edge wall 84 of the opening 28 so that the passageway 50 bypasses the valve body 30, when the latter is in a closed position.

The gas delivery system thus described provides an improved arrangement by integrating the gate valve with the valves 52, 54 and 56, and utilizing a passageway 50 within the housing 22 so as to eliminate the otherwise necessary connections of the various parts, and minimizing the footprint through the passageway sector 50a.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A gas delivery system comprising:
   a gate valve that can be connected between a turbo pump and a process chamber and including a valve body, a valve seat and a housing constructed to support the valve seat, wherein (a) the valve body is secured within the housing so as to move relative to the valve seat between an opened position and a closed position, and (b) the housing is provided with a gas passageway connected to each of the spaces on opposite sides of the valve body when the valve body is in the closed position; and
   a plurality of valves mounted to the housing of the gate valve and arranged so as to control the flow of gas through the passageway so that in operation the chamber and turbo pump can be pumped down through the gas passageway with a second pump connected to one of the valves, and gas can be transferred and the flow controlled through the passageway bypassing the valve body when the valve body is in the closed position.

2. A gas delivery system according to claim 1, wherein the valves are mounted adjacent one another so as to substantially minimize the footprint of a portion of the passageway between the plurality of valves.

3. A gas delivery system according to claim 1, wherein three valves are mounted on the housing of the gate valve, wherein a first of the valves is connected to the second pump so as to control the flow of gas between the passageway and the second pump, a second of the valves controls the flow of gas between the passageway and the space on the side of the gate valve connected to the chamber, and a third of the valves controls the flow of gas to the space on the side of the gate valve connected to the turbo pump.

4. A gas delivery system according to claim 3, wherein the first and second of the valves are opened and the valve body is positioned in the closed position when using the second pump to pump down the chamber with the second pump.

5. A gas delivery system according to claim 3, wherein the first and third of the valves are opened and the valve body is positioned in the closed position when using the second pump to pump down the turbo pump.

6. A gas delivery system according to claim 3, wherein the second and third of the valves are opened and the first of the valves is closed when the valve body is positioned in said closed positions so that the gas flow through the passageway bypasses the closed valve body and can be controlled by either said second or third valve.

7. A gas delivery system according to claim 3, wherein the first of the valves is a shut off valve constructed to either be opened or closed, and at least one of the second and third of the valves is a control valve constructed to control the flow of gas through the passageway when the valve body is in the closed position.

8. A gas delivery system according to claim 1, wherein (a) the housing includes (i) an interior space within which the valve body is moved and (ii) a pair of openings in the housing through which gas passes into the interior space of the housing and out the other side of the gate valve when the valve body is not in the closed position, (b) the valve seat is provided inside the interior space around the edge of one of the openings, and (c) the gas passageway is connected between the interior space at one end, and the edge wall of the one opening between the valve seat and the outside of the housing.

9. A gas delivery system according to claim 1, wherein the valve seat for each of the plurality of valves is formed in said housing.

* * * * *